US012791111B2

(12) United States Patent

Rodriguez

(10) Patent No.: US 12,791,111 B2

(45) Date of Patent: Nov. 10, 2026

(54) SYSTEMS AND APPARATUS FOR A VALVE MANIFOLD

(71) Applicant: ASM IP Holding B.V., Almere (NL)

(72) Inventor: Leonard Rodriguez, Phoenix, AZ (US)

(73) Assignee: ASM IP Holding B.V., Almere (NL)

( * ) Notice: Subject to any disclaimer, the term of this patent is extended or adjusted under 35 U.S.C. 154(b) by 347 days.

(21) Appl. No.: 18/382,568

(22) Filed: Oct. 23, 2023

(65) Prior Publication Data

US 2024/0142014 A1 May 2, 2024

Related U.S. Application Data

(60) Provisional application No. 63/419,512, filed on Oct. 26, 2022.

(51) Int. Cl.
*F16K 27/00* (2006.01)

(52) U.S. Cl.
CPC .................................. *F16K 27/003* (2013.01)

(58) Field of Classification Search
CPC .................................................... F16K 27/003
USPC ........................................................... 138/42
See application file for complete search history.

(56) References Cited

U.S. PATENT DOCUMENTS 3,957,079 A 5/1976 Whiteman
4,896,700 A 1/1990 Stoll
5,459,953 A 10/1995 Fukano
5,480,004 A 1/1996 Snow
5,720,317 A 2/1998 Nimberger
5,722,457 A 3/1998 Wilda
5,771,918 A 6/1998 Fukano
5,823,228 A 10/1998 Chou
6,079,443 A 6/2000 Hutton
6,102,074 A 8/2000 Bouteille
6,176,262 B1 1/2001 Nimberger
6,189,571 B1 2/2001 Hedlund
6,192,596 B1 * 2/2001 Bennett .................. F28D 9/005
422/615
6,389,904 B1 5/2002 Petrich
6,394,138 B1 5/2002 Vu
6,564,872 B2 5/2003 Davey
6,701,962 B2 3/2004 Latino
6,807,981 B2 10/2004 Miyazoe
7,048,007 B2 5/2006 Nordstrom
7,334,605 B2 2/2008 Vu
7,373,955 B2 5/2008 Steinberg
7,938,145 B2 5/2011 Phillips
8,122,910 B2 2/2012 Taskar
8,322,380 B2 12/2012 Taskar
8,327,879 B2 12/2012 Ellis
8,333,214 B2 12/2012 Ellis
8,336,573 B2 12/2012 Ellis
(Continued)

FOREIGN PATENT DOCUMENTS

CA 2185273 A1 3/1997
EP 0389777 B1 8/1993
(Continued)

*Primary Examiner* — David R Deal
(74) *Attorney, Agent, or Firm* — Snell & Wilmer L.L.P.

(57) ABSTRACT

Various embodiments of the present technology may provide a valve manifold having a plurality of tiers with various through-holes and channels. The plurality of tiers may be connected together such that the through-holes and channels form a single, continuous flow path.

20 Claims, 5 Drawing Sheets

(56) References Cited

U.S. PATENT DOCUMENTS

Figure 1:
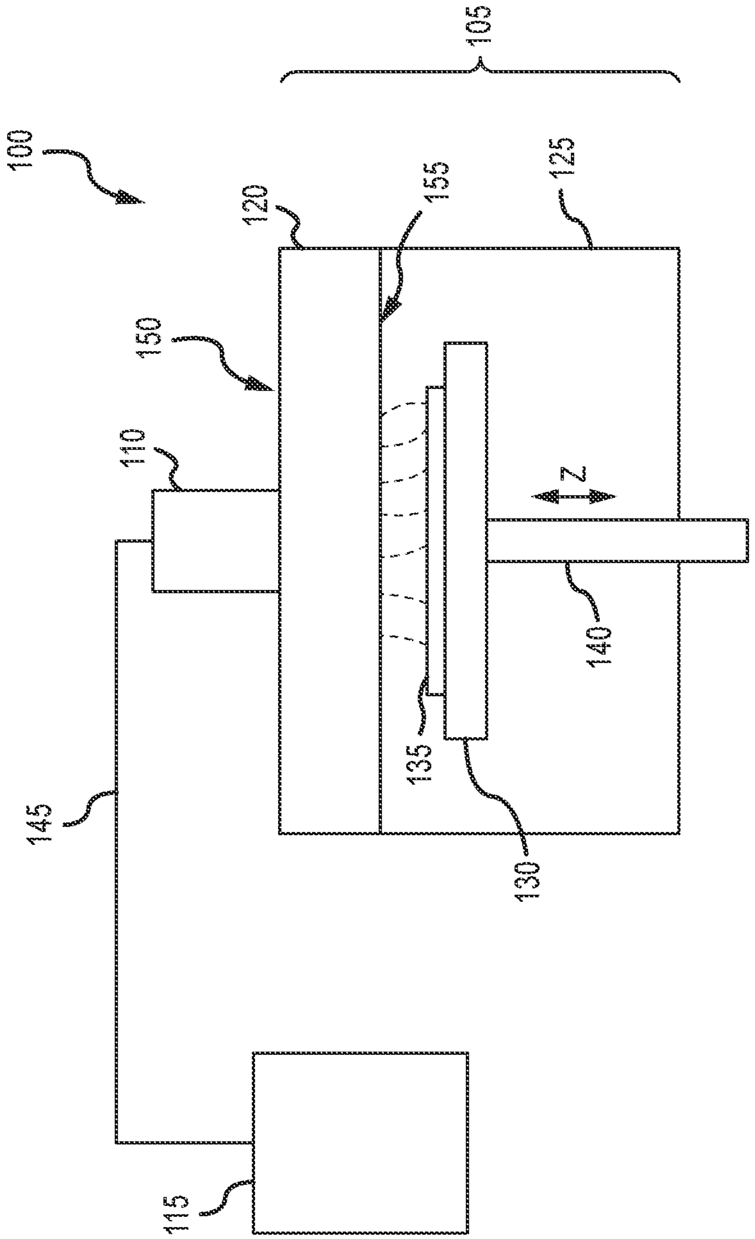

| | | | |
|---|---|---|---|
| 8,905,074 B2 | 12/2014 | Cobb | |
| 8,950,433 B2 | 2/2015 | Manofsky, Jr. | |
| 9,896,322 B2 | 2/2018 | Hecht | |
| 10,260,534 B2 | 4/2019 | Sefcik | |
| 10,627,034 B2 | 4/2020 | Sasaki | |
| 10,731,677 B2 | 8/2020 | Jamison | |
| 10,823,299 B2 | 11/2020 | Miyazoe | |
| 10,941,872 B2 | 3/2021 | Atkin | |
| 10,947,822 B2 | 3/2021 | Gomes Martins | |
| 11,320,058 B2 | 5/2022 | Kidder | |
| 11,592,119 B2 | 2/2023 | Keeper | |
| 2005/0072481 A1 | 4/2005 | Hanada | |
| 2007/0280862 A1* | 12/2007 | Davis | F16K 27/003 422/600 |
| 2008/0053543 A1 | 3/2008 | Baier | |
| 2008/0072977 A1 | 3/2008 | George | |
| 2008/0302426 A1 | 12/2008 | Mulligan | |
| 2009/0078329 A1* | 3/2009 | Minegishi | F15B 13/0807 138/42 |
| 2011/0226365 A1* | 9/2011 | Equit | F16K 11/022 137/861 |
| 2013/0269791 A1 | 10/2013 | Herrmann | |
| 2022/0199431 A1 | 6/2022 | Stumpf | |

FOREIGN PATENT DOCUMENTS

| | | | |
|---|---|---|---|
| EP | 2068005 | A1 | 6/2009 |
| EP | 2412985 | B1 | 11/2017 |
| WO | 2013097918 | A1 | 7/2013 |

* cited by examiner

SYSTEMS AND APPARATUS FOR A VALVE MANIFOLD

CROSS-REFERENCE TO RELATED APPLICATIONS

This application is a nonprovisional of, and claims priority to and the benefit of, U.S. Provisional Patent Application No. 63/419,512, filed Oct. 26, 2022 and entitled "SYSTEMS AND APPARATUS FOR A VALVE MANIFOLD," which is hereby incorporated by reference herein.

FIELD OF INVENTION

The present disclosure generally relates to an apparatus for semiconductor equipment. More particularly, the present disclosure relates to a valve manifold and system utilizing a valve manifold during the fabrication of semiconductor devices.

BACKGROUND OF THE TECHNOLOGY

Equipment used during the semiconductor manufacturing process may provide a valve manifold to mix and/or deliver chemistry (e.g., in the form of a gas) to a reaction chamber. Conventional valve manifolds may suffer from poor mixing due to the length of the flow path and/or have dead volumes created by o-rings. Dead volumes may reduce the temporal separation of different pulsed source gases. This overlap of pulsed gases may lead to reactions between the different gases in the dead spaces, which may cause particulate formation and degradation of the silicon wafer being processed. Accordingly, it may be desired to have a valve manifold with a flow path having a length that allows some chemistries to sufficiently mix as well as reducing dead volumes.

SUMMARY OF THE INVENTION

Various embodiments of the present technology may provide a valve manifold having a plurality of tiers with various through-holes and channels. The plurality of tiers may be connected together such that the through-holes and channels form a single, continuous flow path.

According to one aspect, a valve manifold comprises: a first tier, comprising: a first surface; a second surface opposite and in parallel with the first surface; a first through-hole extending from the first surface to the second surface; and a first channel disposed at the first surface; a second tier disposed above the first tier and comprising: a third surface adjacent to the second surface; a fourth surface opposite and in parallel with the third surface; and a plurality of through-holes extending from the third surface to the fourth surface; and a third tier disposed above the second tier and comprising: a fifth surface adjacent to the fourth surface; a sixth surface opposite and in parallel with the fifth surface; a fifth through-hole extending from the fifth surface to the sixth surface; and a second channel disposed at the fifth surface.

In an embodiment of the above valve manifold, the plurality of through-holes comprises a second through-hole, a third through-hole, and a fourth through-hole.

In an embodiment of the above valve manifold, the first channel connects the second through-hole to the fourth through-hole.

In an embodiment of above valve manifold, the second channel connects the third through-hole to the fourth through-hole.

In an embodiment of the above valve manifold, the first, second, third, fourth and fifth through-holes together with the first and second channels form a single, continuous flow path.

In an embodiment of the above valve manifold, the fifth through-hole aligns with one through-hole from the plurality of through-holes.

In an embodiment of the above valve manifold, the first through-hole aligns with one through-hole from the plurality of through-holes.

In an embodiment of the above valve manifold, the first channel aligns with at least two through-holes from the plurality of through-holes.

In an embodiment of the above valve manifold, the second channel aligns with at least two through-holes from the plurality of through-holes.

In an embodiment of the above valve manifold, the fifth through-hole aligns with one through-hole from the plurality of through-holes.

According to another aspect, a valve manifold comprises: a first tier, comprising: a first surface; a second surface opposite and in parallel with the first surface; a first through-hole extending from the first surface to the second surface; and a first channel disposed at the first surface; a second tier disposed above the first tier and comprising: a third surface; a fourth surface opposite and in parallel with the third surface; and a plurality of through-holes, each through-hole extending from the third surface to the fourth surface, wherein the plurality of through-holes comprises a second through-hole, a third through-hole, and a fourth through-hole, and wherein: the third through-hole aligns with the first through-hole; and the second and fourth through-holes align with the first channel; and a third tier disposed above the second tier and comprising: a fifth surface; a sixth surface opposite and in parallel with the fifth surface; a fifth through-hole extending from the fifth surface to the sixth surface and aligned with the second through-hole; and a second channel disposed at the fifth surface and aligned with the third and fourth through-holes.

In an embodiment of the above valve manifold, the first channel connects the second through-hole to the fourth through-hole.

In an embodiment of the above valve manifold, the second channel connects the third through-hole to the fourth through-hole.

In an embodiment of the above valve manifold, the first, second, third, fourth and fifth through-holes together with the first and second channels form a single, continuous flow path.

In an embodiment of the above valve manifold, the valve manifold further comprises a first gasket disposed between the first tier and the second tier, and comprising a first plurality of openings that correspond in shape to the first through-hole and the first channel; and a second gasket disposed between the second tier an the third tier, and comprising a second plurality of openings that correspond in shape to the fifth through-hole and the second channel.

According to yet another aspect, a system, comprises: a reaction chamber comprising an inlet; a valve manifold having a single, continuous flow path, and comprising: a first tier connected to the reaction chamber, and comprising: a first through-hole aligned with the inlet; and a first channel; a second tier disposed above the first tier and comprising: a plurality of through-holes comprising a second through-hole, a third through-hole, and a fourth through-hole, wherein: the third through-hole aligns with the first through-hole; and the second and fourth through-holes align with the first channel; and a third tier disposed above the second tier and comprising: a fifth through-hole aligned with the second through-hole; and a second channel aligned with and connect the third and fourth through-holes.

In an embodiment of the above system, the apparatus further comprises: a first gasket disposed between the first tier and the second tier, and comprising a first plurality of openings that correspond in shape to the first through-hole and the first channel; and a second gasket disposed between the second tier an the third tier, and comprising a second plurality of openings that correspond in shape to the fifth through-hole and the second channel.

In an embodiment of the above system, the first channel connects the second through-hole to the fourth through-hole.

In an embodiment of the above system, the second, third, and fourth through-holes are vertically oriented and extend from a surface of the second tier to an opposing, parallel surface of the second tier.

In an embodiment of the above system, the first channel is disposed at a surface of the first tier; and the second channel is disposed at a surface of the third tier.

BRIEF DESCRIPTION OF THE DRAWING FIGURES

A more complete understanding of the present technology may be derived by referring to the detailed description when considered in connection with the following illustrative figures. In the following figures, like reference numbers refer to similar elements and steps throughout the figures.

Figure 2:
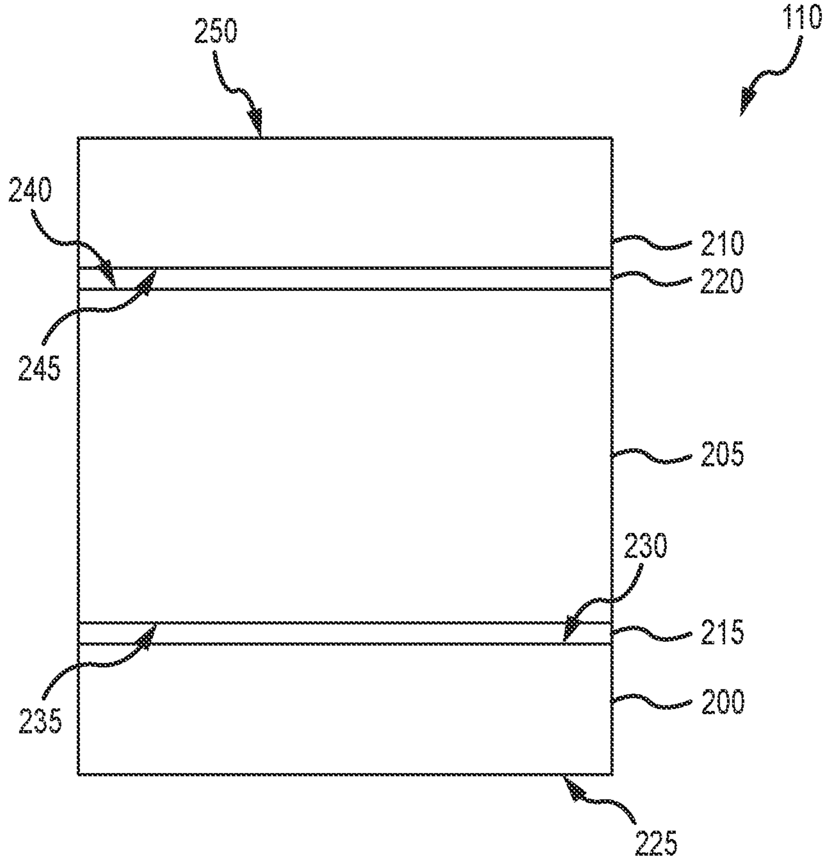
Figure 3:
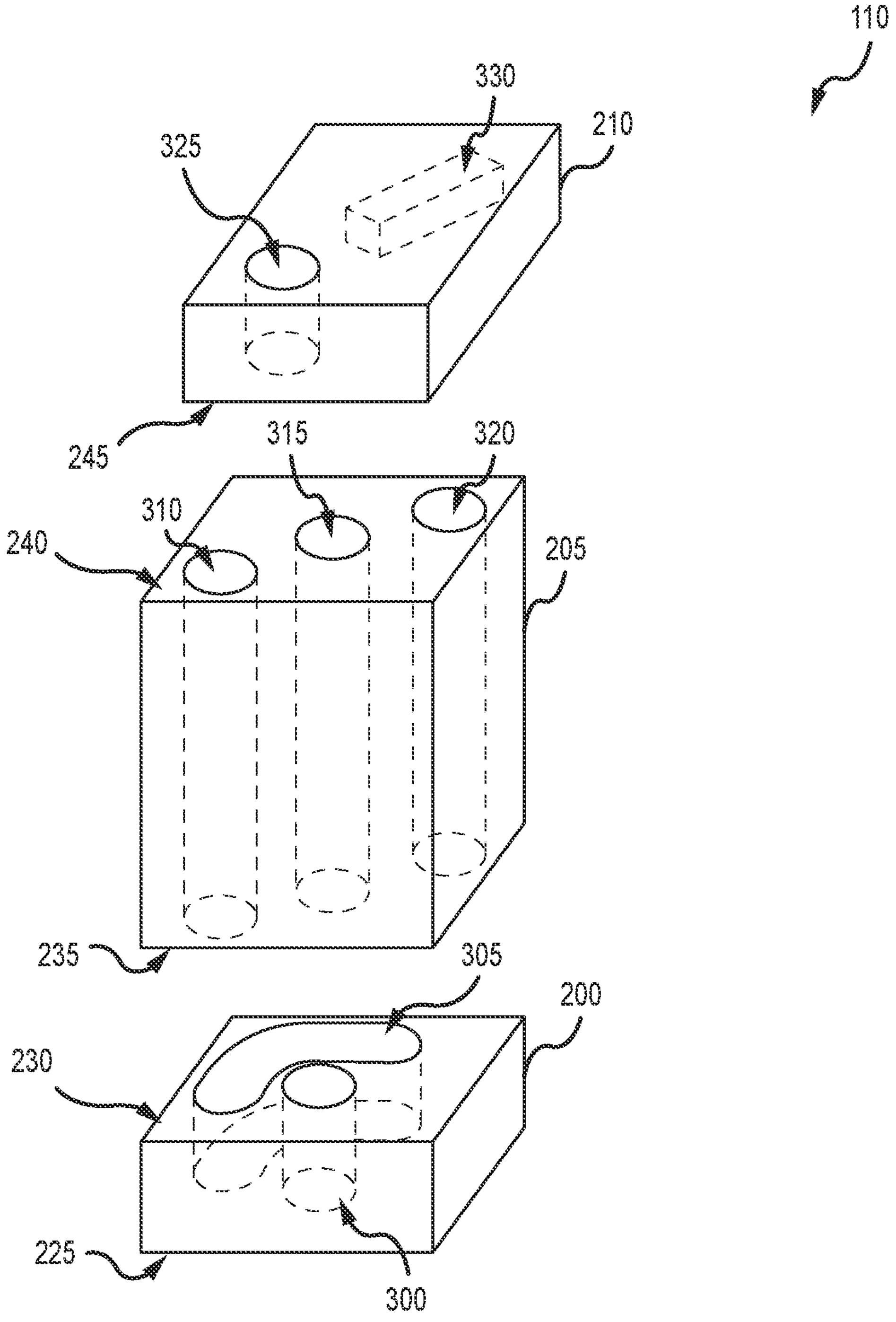
Figure 4:
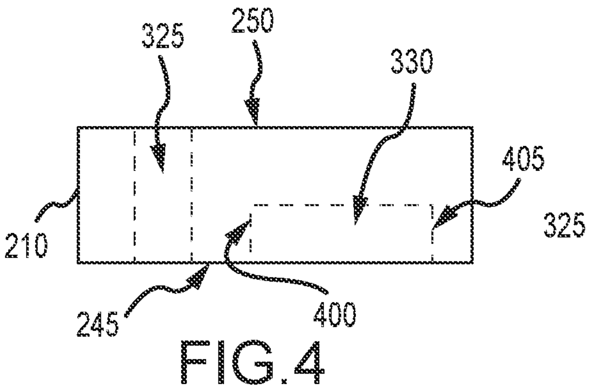
Figure 7:
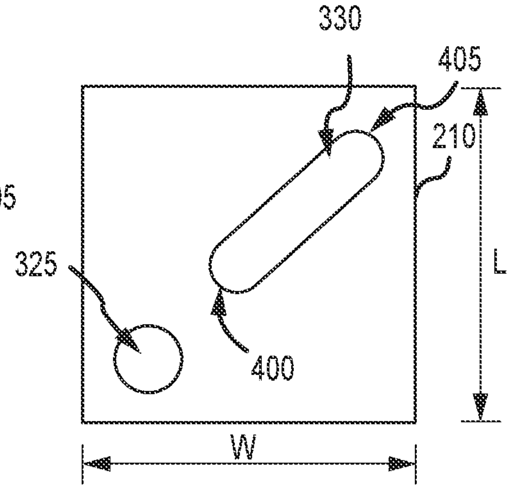
Figure 5:
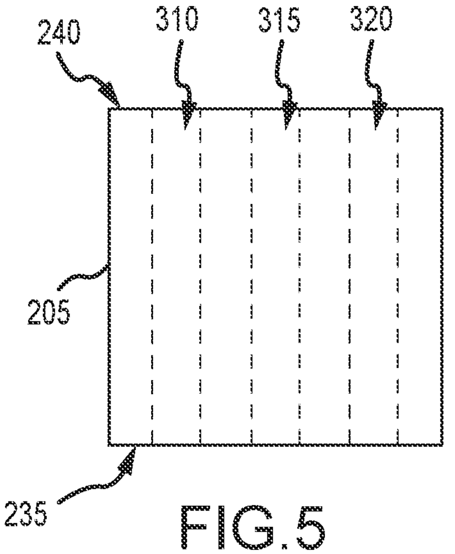
Figure 8:
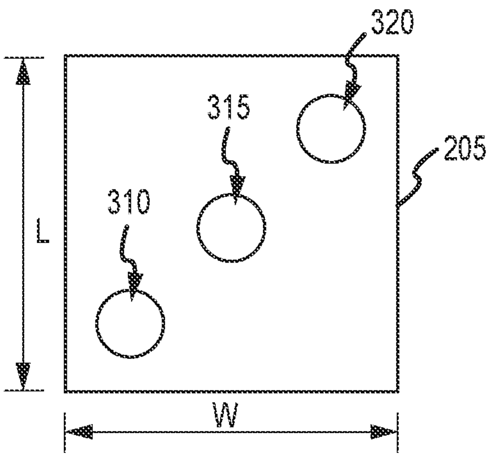
Figure 6:
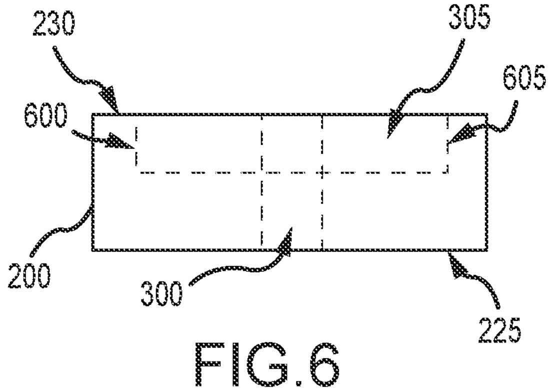
Figure 9:
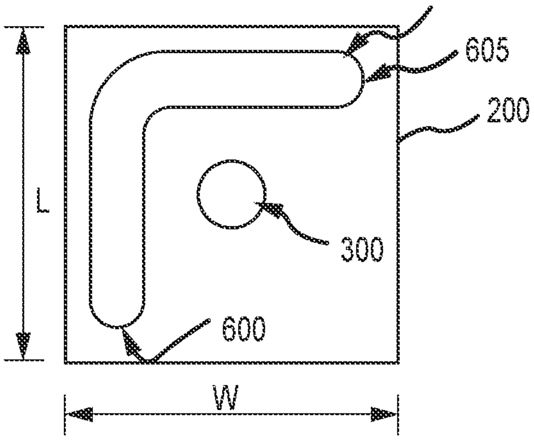
Figure 10:
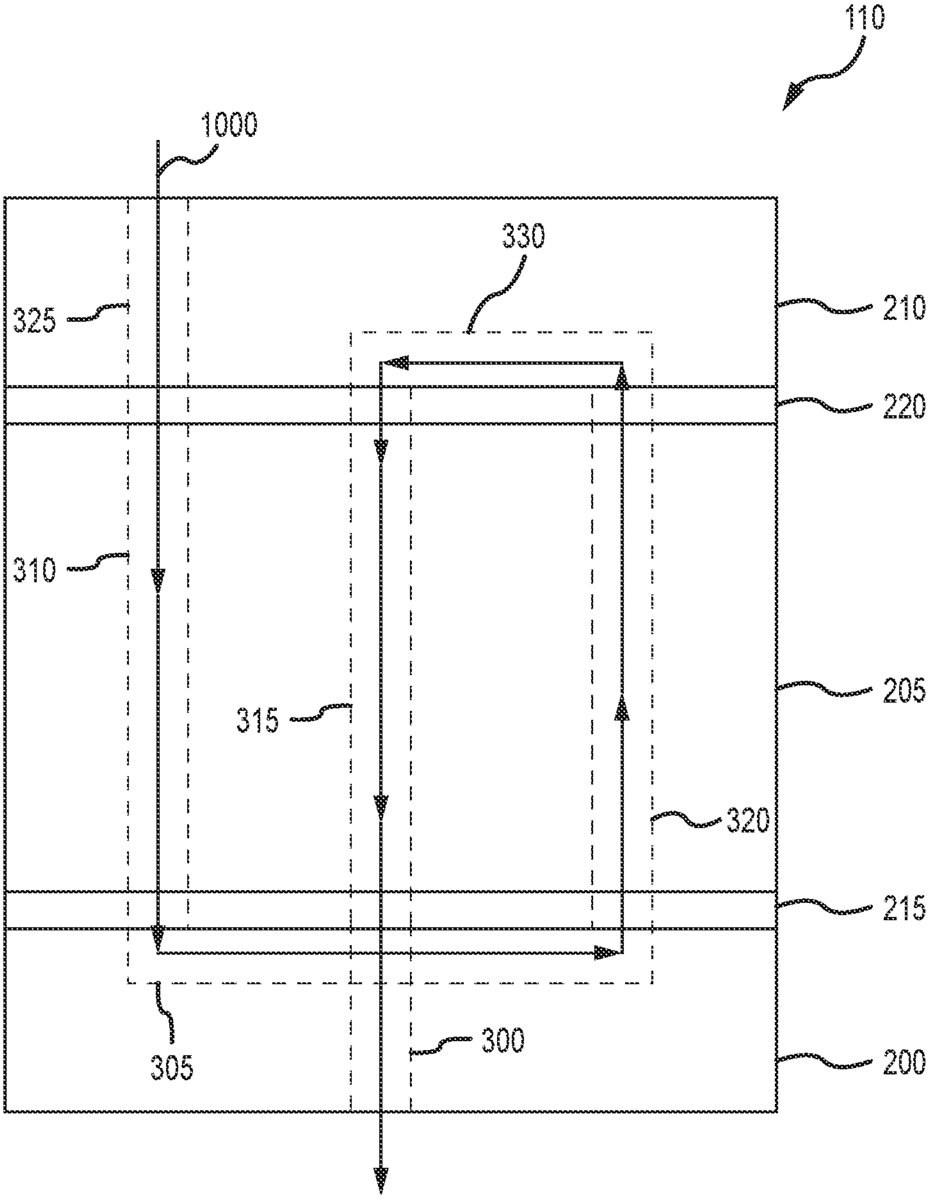

FIG. 1 representatively illustrates a system in accordance with an exemplary embodiment of the present technology;

FIG. 2 representatively illustrates a side view of a valve manifold in accordance with an exemplary embodiment of the present technology;

FIG. 3 representatively illustrates an exploded view of the valve manifold in accordance with an exemplary embodiment of the present technology;

FIG. 4 representatively illustrates a side view of a top tier of the valve manifold in accordance with an exemplary embodiment of the present technology;

FIG. 5 representatively illustrates a side view of a middle tier of the valve manifold in accordance with an exemplary embodiment of the present technology;

FIG. 6 representatively illustrates a side view of a bottom tier of the valve manifold in accordance with an exemplary embodiment of the present technology;

FIG. 7 representatively illustrates a top view of the top tier of the valve manifold in accordance with an exemplary embodiment of the present technology;

FIG. 8 representatively illustrates a top view of the middle tier of the valve manifold in accordance with an exemplary embodiment of the present technology;

FIG. 9 representatively illustrates a top view of the bottom tier of the valve manifold in accordance with an exemplary embodiment of the present technology; and FIG. 10 representatively illustrates a flow path of the valve manifold in accordance with an exemplary embodiment of the present technology.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various showerheads, reaction chambers, and susceptors. Further, the present technology may employ any number precursors and/or reactants to achieve a desired processing step.

Referring to FIG. 1, an exemplary system 100 may comprise a reaction chamber 105 for processing a substrate, such as a wafer 135. The reaction chamber 105 may comprise a processing chamber 125 and a showerhead assembly 120. The processing chamber 125 may comprise an interior space configured for processing the wafer 135. For example, the processing chamber 125 may be equipped with exhaust ducts, heating elements, sensors, and the like, to achieve a desired temperature, pressure, conductance, and the like.

The showerhead assembly 120 may comprise a top surface 150 and a bottom surface 155. The top and bottom surfaces 150, 155 may be horizontally-oriented, where the top and bottom surfaces 150, 155 are parallel to each other. The showerhead assembly 120 may comprise a plurality of through-holes (not shown) that end at a bottom surface 150 of the showerhead assembly and are configured to flow precursors and/or reactants toward the wafer 135. Accordingly, the showerhead assembly 120 may be positioned above the wafer 135 and the processing chamber 125.

The system 100 may further comprise a susceptor 130 disposed within the interior space of the processing chamber 125 and configured to support the wafer 135. The susceptor 130 may be supported by a pedestal 140. In various embodiments, the susceptor 130 may be configured to move up and down along a z-axis (Z), for example from a first position to a second position. In other cases, the susceptor 130 may remain stationary.

In various embodiments, the susceptor 130 may be formed from ceramic (alumina, AlOx), or a metal (e.g., a metallic material such as stainless steel, Hastelloy, or the like). The susceptor 130 may comprise a top surface that is horizontally-oriented and positioned directly below the showerhead assembly 120. The wafer 135 (or other substrate) may rest on the top surface of the susceptor 130 during processing.

The susceptor 130 may comprise a heating element (not shown) configured to heat the wafer 135 to any desirable temperature during processing. The heating element may comprise any suitable heating element and may be arranged in any desired shape or pattern. In various embodiments, the susceptor 130 may further comprise through-holes (not shown) for which lift pins (not shown) may be disposed within.

The system 100 may further comprise a valve manifold 110 to deliver various precursors and/or reactants to the processing chamber 125 via the showerhead assembly 120. In various embodiments, the valve manifold 110 may be positioned on the top surface 150 of the showerhead assembly 120.

In various embodiments, and referring to FIGS. 2-10, the valve manifold 110 may comprise a top tier 210, a middle tier 205, and a bottom tier 200. Each tier 210, 205, 200 may be formed from a metallic material, such as aluminum, stainless steel, nickel alloy, Hastelloy, or any other suitable material. In various embodiments, the top, middle, and bottom tiers 210, 205, 200 are connected or otherwise secured together with any suitable fasteners, such as bolts, screws, and the like. In various embodiments, the bottom tier 200 may be directly attached to the top surface 150 of the showerhead assembly 120 using any suitable fasteners, such as bolts, screws, and the like.

In various embodiments, the bottom tier 200 may comprise a first surface 225 and an opposing second surface 230 that is in parallel with the first surface 225. The bottom tier 200 may further comprise a first through-hole 300 that extends from the first surface 225 to the second surface 230. In an exemplary embodiment, the first through-hole 300 may have a circular cross section, however, in other embodiments, the first through-hole 300 may have any suitable shape. In various embodiments, the first through-hole 300 may align with an inlet disposed at the top surface 150 of the showerhead assembly 120.

The bottom tier 200 may further comprise a first channel 305 disposed at the second surface 230. Specifically, the first channel 305 comprises a groove within the second surface 230 of the bottom tier 200. The first channel 305 further comprises a first terminal end 600 and a second terminal end 605. In various embodiments, the first channel 305 may form an L-shape or a C-shape. However, the first channel 305 may have any other suitable shape.

In various embodiments, the middle tier 205 may comprise a third surface 235 and an opposing fourth surface 240 that is in parallel with the third surface 235. The third surface 235 may be adjacent to the second surface 230 of the bottom tier 200. The middle tier 205 may further comprise a plurality of through-holes. For example, the middle tier 205 may comprise a second through-hole 310, a third through-hole 315, and a fourth through-hole 320. Each through-hole 310, 315, 320 from the plurality of through-holes may extend from the third surface 235 to the fourth surface 240. In an exemplary embodiment, the second, third, and fourth through-holes may have a circular cross section, however, in other embodiments, the through-holes 310, 315, 320 may have any suitable shape. In various embodiments, the third through-hole 315 may have the same cross sectional shape and size as the first through-hole 300.

In various embodiments, the second and fourth through-holes 310, 320 may align with the first channel 305, such that the first channel 305 connects the second and fourth through-holes 310, 320, via connecting first ends of the through-holes 310, 320. For example, the second though-hole 310 may be aligned with the first end 600 of the first channel 305 while the fourth through-hole is aligned with the second end 605 of the first channel 305.

In various embodiments, the top tier 210 may comprise a fifth surface 245 and an opposing sixth surface 250 that is in parallel with the fifth surface 245. The fifth surface 245 may be adjacent to the fourth surface 240 of the middle tier 205. The top tier 210 may further comprise a fifth through-hole 325 that extends from the fifth surface 245 to the sixth surface 250. In an exemplary embodiment, the fifth through-hole 325 may have a circular cross section, however, in other embodiments, the fifth through-hole 325 may have any suitable shape. In an exemplary embodiment, the fifth through-hole 325 may have the same cross sectional shape and size as the second through-hole 310.

The top tier 210 may further comprise a second channel 330 disposed at the fifth surface 245. Specifically, the second channel 330 comprises a groove within the fifth surface 245 of the top tier 210. The second channel 330 further comprises a first terminal end 400 and a second terminal end 405. In various embodiments, the third and fourth through-holes 315, 320 may align with the second channel 330, such that the second channel 330 connects the third and fourth through-holes 315, 320, via directly connecting second ends of the through-holes 315, 320. For example, the third though-hole 315 may be aligned with the first end 400 of the second channel 330 while the fourth through-hole is aligned with the second end 405 of the second channel 330. In an exemplary embodiment, the second channel 330 may have a linear shape, however, the second channel 330 may have any other suitable shape.

In various embodiments, and referring to FIGS. 2 and 7-9, the valve manifold 110 may further comprise a first gasket 215 disposed between the bottom tier 200 and the middle tier 205 to provide a seal between the respective tiers. The first gasket 215 may comprise a substantially flat sheet of sealing material, such as a rubber, a fluoropolymer elastomer and synthetic rubber compound, or any other suitable sealing material, that extends across the entire width W and length L of the tiers.

The first gasket 215 may comprise a plurality of openings that correspond in size and shape to the first through-hole 300 and the first channel 305 to allow the first through-hole 300 to connect to the third through-hole 315 and allow the first channel 305 to connect the second and fourth through-holes 310, 320.

In various embodiments, the valve manifold 110 may further comprise a second gasket 220 disposed between the middle tier 205 and the top tier 210 to provide a seal between the respective tiers. The first gasket 215 may comprise a substantially flat sheet of sealing material, such as a rubber, a fluoropolymer elastomer and synthetic rubber compound, or any other suitable sealing material, that extends across the entire width W and length L of the tiers.

The second gasket 220 may comprise a plurality of openings that correspond in size and shape to the fifth through-hole 325 and the second channel 330 to allow the fifth through-hole 325 to connect to the second through-hole 310 and allow the second channel 330 to connect the third and fourth through-holes 315, 320.

In an alternative embodiment, and referring to FIGS. 1, 2, 6 and 9, the valve manifold 110 may contain only the top tier 210 and the middle tier 205. In the present case, the bottom tier 200 may be omitted, and the first through-hole 300 and the first channel 305 may instead be machined directly into the top surface 150 of the showerhead assembly 120.

During operation, and referring to FIG. 10, a gas may flow along a flow path formed by the first, second, third, fourth, and fifth through-holes 300, 310, 315, 320, 325 and the first and second channels 305, 330. In an exemplary embodiment, the first, second, third, fourth, and fifth through-holes 300, 310, 315, 320, 325 and the first and second channels 305, 330 form a single, continuous flow path 1000. In particular, the gas may enter the valve manifold 110 at and flow through the fifth through-hole 325 into the second through-hole 310. The gas may flow through the second through-hole 310 and into the first channel 305 where the gas is directed, via the first channel 305, to the fourth through-hole 320. The gas may flow through the fourth through-hole and into the second channel 330 where the gas is directed, via the second channel 330, to the third through-hole 315. The gas may flow through the third through-hole 315, then flow through the first through hole 300, and then exit the valve manifold 110.

In the foregoing description, the technology has been described with reference to specific exemplary embodiments. The particular implementations shown and described are illustrative of the technology and its best mode and are not intended to otherwise limit the scope of the present technology in any way. Indeed, for the sake of brevity, conventional manufacturing, connection, preparation, and other functional aspects of the method and system may not be described in detail. Furthermore, the connecting lines shown in the various figures are intended to represent exemplary functional relationships and/or steps between the various elements. Many alternative or additional functional relationships or physical connections may be present in a practical system.

The technology has been described with reference to specific exemplary embodiments. Various modifications and changes, however, may be made without departing from the scope of the present technology. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any order, unless otherwise expressly specified, and are not limited to the explicit order presented in the specific examples. Additionally, the components and/or elements recited in any apparatus embodiment may be assembled or otherwise operationally configured in a variety of permutations to produce substantially the same result as the present technology and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology, as expressed in the following claims.

What is claimed is:

1. A valve manifold, comprising:
a first tier, comprising:
a first surface;
a second surface opposite and in parallel with the first surface;
a first through-hole extending from the first surface to the second surface; and
a first channel disposed at the second surface;
a second tier disposed above the first tier and comprising:
a third surface adjacent to the second surface;
a fourth surface opposite and in parallel with the third surface; and
a plurality of through-holes extending from the third surface to the fourth surface; and
a third tier disposed above the second tier and comprising:
a fifth surface adjacent to the fourth surface;
a sixth surface opposite and in parallel with the fifth surface;
a fifth through-hole extending from the fifth surface to the sixth surface; and
a second channel disposed at the fifth surface.

2. The valve manifold according to claim 1, wherein the plurality of through-holes comprises a second through-hole, a third through-hole, and a fourth through-hole.

3. The valve manifold according to claim 2, wherein the first channel connects the second through-hole to the fourth through-hole.

4. The valve manifold according to claim 2, wherein the second channel connects the third through-hole to the fourth through-hole.

5. The valve manifold according to claim 2, wherein the fifth through-hole aligns with the second through-hole from the plurality of through-holes.

6. The valve manifold according to claim 1, wherein the first, second, third, fourth and fifth through-holes together with the first and second channels form a single, continuous flow path.

7. The valve manifold according to claim 1, wherein the fifth through-hole aligns with one through-hole from the plurality of through-holes.

8. The valve manifold according to claim 1, wherein the first through-hole aligns with one through-hole from the plurality of through-holes.

9. The valve manifold according to claim 1, wherein the first channel aligns with at least two through-holes from the plurality of through-holes.

10. The valve manifold according to claim 1, wherein the second channel aligns with at least two through-holes from the plurality of through-holes.

11. A valve manifold, comprising:
a first tier, comprising:
a first surface;
a second surface opposite and in parallel with the first surface;
a first through-hole extending from the first surface to the second surface; and
a first channel disposed at the second surface;
a second tier disposed above the first tier, and comprising:
a third surface;
a fourth surface opposite and in parallel with the third surface; and
a plurality of through-holes, each through-hole extending from the third surface to the fourth surface, wherein the plurality of through-holes comprises a second through-hole, a third through-hole, and a fourth through-hole, and wherein:
the third through-hole aligns with the first through-hole; and
the second and fourth through-holes align with the first channel; and
a third tier disposed above the second tier, and comprising:
a fifth surface;
a sixth surface opposite and in parallel with the fifth surface;
a fifth through-hole extending from the fifth surface to the sixth surface and aligned with the second through-hole; and a second channel disposed at the fifth surface and aligned with the third and fourth through-holes.

12. The valve manifold according to claim 11, wherein the first channel connects the second through-hole to the fourth through-hole.

13. The valve manifold according to claim 11, wherein the second channel connects the third through-hole to the fourth through-hole.

14. The valve manifold according to claim 11, wherein the first, second, third, fourth and fifth through-holes together with the first and second channels form a single, continuous flow path.

15. The valve manifold according to claim 11, further comprising:

a first gasket disposed between the first tier and the second tier, and comprising a first plurality of openings that correspond in shape to the first through-hole and the first channel; and a second gasket disposed between the second tier and the third tier, and comprising a second plurality of openings that correspond in shape to the fifth through-hole and the second channel.

16. A system, comprising:

a reaction chamber comprising an inlet;

a valve manifold having a single, continuous flow path, and comprising:

a first tier connected to the reaction chamber, and comprising:

a first through-hole aligned with the inlet; and a first channel;

a second tier disposed above the first tier, and comprising:

a plurality of through-holes comprising a second through-hole, a third through-hole, and a fourth through-hole, wherein:

the third through-hole aligns with the first through-hole; and the second and fourth through-holes align with the first channel; and a third tier disposed above the second tier, and comprising:

a fifth through-hole aligned with the second through-hole; and a second channel aligned with and connect the third and fourth through-holes.

17. The system according to claim 16, wherein the apparatus further comprises:

a first gasket disposed between the first tier and the second tier, and comprising a first plurality of openings that correspond in shape to the first through-hole and the first channel; and a second gasket disposed between the second tier and the third tier, and comprising a second plurality of openings that correspond in shape to the fifth through-hole and the second channel.

18. The system according to claim 16, wherein the first channel connects the second through-hole to the fourth through-hole.

19. The system according to claim 16, wherein the second, third, and fourth through-holes are vertically oriented and extend from a surface of the second tier to an opposing, parallel surface of the second tier.

20. The system according to claim 16, wherein:

the first channel comprises a groove within a surface of the first tier; and the second channel comprises a groove within a surface of the third tier.

* * * * *